United States Patent
Tang et al.

(10) Patent No.: US 10,446,178 B1
(45) Date of Patent: Oct. 15, 2019

(54) WRITER WITH RECESSED SPIN FLIPPING ELEMENT IN THE WRITE GAP

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/190,774

(22) Filed: Nov. 14, 2018

(51) Int. Cl.
| | |
|---|---|
| G11B 5/127 | (2006.01) |
| G11B 5/31 | (2006.01) |
| G11B 5/23 | (2006.01) |
| G11B 5/48 | (2006.01) |
| G11B 5/21 | (2006.01) |
| G11B 5/00 | (2006.01) |

(52) U.S. Cl.
CPC .......... *G11B 5/4826* (2013.01); *G11B 5/1278* (2013.01); *G11B 5/21* (2013.01); *G11B 5/23* (2013.01); *G11B 5/315* (2013.01); *G11B 5/3133* (2013.01); *G11B 2005/0024* (2013.01)

(58) Field of Classification Search
CPC ....... G11B 5/1278; G11B 5/23; G11B 5/3133; G11B 5/315
USPC ....................................................... 360/125.3
See application file for complete search history.

(56) References Cited

U.S. PATENT DOCUMENTS

| | | | |
|---|---|---|---|
| 6,785,092 B2 | 8/2004 | Covington et al. | |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification date: Nov. 28, 2012, 11 pages.

(Continued)

*Primary Examiner* — Jefferson A Evans
(74) *Attorney, Agent, or Firm* — Saile Ackerman LLC; Stephen B. Ackerman (57) ABSTRACT

A microwave assisted magnetic recording (MAMR) writer has a recessed spin flipping element formed in the write gap between the MP tapered trailing side and a first trailing shield, a thickness ≤ to the write gap thickness, and a width ≤ to a maximum width of the MP tapered trailing side. The spin flipping element has a lower non-spin preserving layer, a middle flux guiding layer (FGL), and an upper spin preserving layer. The FGL has a magnetization that flips to a direction substantially anti-parallel to the write gap field when a current of sufficient magnitude is applied from the trailing shield towards the MP thereby increasing reluctance in the write gap and forcing additional flux out of the MP at the air bearing surface to enhance writability and tracks per inch capability on a recording medium while maintaining bits per inch capability compared with conventional MAMR writers.

20 Claims, 9 Drawing Sheets

(56) References Cited

U.S. PATENT DOCUMENTS

| | | |
|---|---|---|
| 7,835,111 B2 | 11/2010 | Flint et al. |
| 7,957,098 B2 | 6/2011 | Yamada et al. |
| 7,963,024 B2 | 6/2011 | Neuhaus |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,264,792 B2 | 9/2012 | Bai et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,135,933 B2 * | 9/2015 | Nunokawa ............ G11B 5/3116 |
| 9,202,528 B2 | 12/2015 | Furukawa et al. |
| 9,299,367 B1 | 3/2016 | Tang et al. |
| 9,355,655 B1 * | 5/2016 | Udo ..................... G11B 5/1278 |
| 9,361,912 B1 | 6/2016 | Liu et al. |
| 9,406,317 B1 | 8/2016 | Tang et al. |
| 9,466,319 B1 | 10/2016 | Tang et al. |
| 9,666,216 B1 * | 5/2017 | Kobayashi ............... G11B 5/02 |
| 9,824,701 B2 | 11/2017 | Tang et al. |
| 9,966,091 B2 | 5/2018 | Chen et al. |
| 10,032,469 B2 | 7/2018 | Lim et al. |
| 10,032,470 B1 | 7/2018 | Degawa et al. |
| 10,325,618 B1 * | 6/2019 | Wu ........................... G11B 5/11 |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Alaki et al. |
| 2011/0211271 A1 | 9/2011 | Ng et al. |
| 2012/0314326 A1 * | 12/2012 | Takeo ...................... G11B 5/02 360/125.03 |
| 2014/0071562 A1 | 3/2014 | Chen et al. |
| 2014/0160598 A1 * | 6/2014 | Takashita ................ G11B 5/147 360/234.3 |
| 2014/0177092 A1 | 6/2014 | Katada et al. |
| 2015/0043106 A1 | 2/2015 | Yamada et al. |
| 2016/0218728 A1 | 7/2016 | Zhu |
| 2017/0092304 A1 | 3/2017 | Koizumi et al. |
| 2017/0133044 A1 | 5/2017 | Lim |
| 2018/0075868 A1 | 3/2018 | Koui et al. |
| 2019/0088275 A1 * | 3/2019 | Narita ................... G11B 5/3116 |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

* cited by examiner

WRITER WITH RECESSED SPIN FLIPPING ELEMENT IN THE WRITE GAP

RELATED PATENT APPLICATIONS

This application is related to the following: U.S. Pat. No. 8,582,240; U.S. patent application Ser. No. 16/037,197, filed on Jul. 17, 2018; and Ser. No. 16/190,790, filed on Nov. 14, 2018; assigned to a common assignee and herein incorporated by reference in their entirety.

TECHNICAL FIELD

The present disclosure relates to a design for a microwave assisted microwave recording (MAMR) writer wherein a spin flipping element comprised of a magnetic layer sandwiched between a spin preserving layer and a non-spin preserving layer is formed in the write gap, and is recessed behind the air bearing surface (ABS), and has a magnetic moment that flips to an opposite direction when a current of sufficient magnitude is applied during a write process thereby increasing the reluctance in the write gap and forcing additional flux out of the main pole (MP) tip at the ABS to enhance the write field on the magnetic recording medium.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR), which is described by J-G. Zhu et al. in "Microwave Assisted Magnetic Recording", IEEE Trans. Magn., vol. 44, pp. 125-131 (2008). Although MAMR has been in development for a number of years, it is not shown enough promise to be introduced into any products yet because of several technical problems. One problem is a fringing growth when the spin torque oscillator (STO) bias is turned on. Thus, when a STO layer is inserted into the write gap, and magnetization therein is flipped to be anti-parallel to the magnetic field in the gap, the reluctance in the gap is increased, and the write field as well as the return field to the trailing shield are boosted. Moreover, fringing will grow as the write field increases, and dramatically decrease the writer tracks per inch (TPI) capability.

Spin transfer (spin torque) devices are based on a spin-transfer effect that arises from the spin dependent electron transport properties of ferromagnetic-non-magnetic spacer-ferromagnetic multilayers. When a spin-polarized current passes through a magnetic multilayer in a CPP (current perpendicular to plane) configuration, the magnetic moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high.

In a MAMR writer, the main pole generates a large local magnetic field to change the magnetization direction of the medium in proximity to the writer. By switching the direction of the field using a switching current that drives the writer, one can write a plurality of media bits on a magnetic recording medium. In MAMR, a spin torque oscillator (STO) is inserted in the WG to apply an additional magnetic field on the magnetic medium and thereby lower the switching current necessary for a write process. Magnetic flux in the main pole proceeds through the ABS and into a medium bit layer and soft underlayer (SUL). In some common designs, the flux returns to the write head through a trailing side loop comprised of a trailing shield structure, and through a leading side loop that includes a leading shield and back gap connection. There is also a gap field that exits the main pole through the write gap, side gaps, and leading gap, and is not directly responsible for writing. Therefore, an improved write gap (WG) design is desirable where the write gap field is minimized during a write process and thereby forces a greater portion of magnetic flux to exit the main pole tip at the ABS for enhanced writability. Furthermore, the WG design should not cause an enhanced fringing field when the write field increases.

SUMMARY

One objective of the present disclosure is to provide a MAMR writer having a spin flipping element that increases the reluctance in the WG between the MP trailing side and trailing shield thereby forcing more magnetic flux through the MP tip at the ABS and into a magnetic recording medium during a write process.

A second objective of the present disclosure is to provide a spin flipping element according to the first objective that has no adverse effect on fringing field and TPI as the write field increases.

According to one embodiment of the present disclosure, these objectives are achieved with a spin flipping element also called a STO that is formed in the WG and is recessed behind the ABS. The MP may be surrounded with an all around shield structure comprised of a trailing shield formed on the write gap, a side shield adjoining each side gap, and a leading shield below the leading gap. The STO has an inner non-spin preserving conductor layer, a middle flux guiding layer (FGL), and an outer spin preserving conductor layer where an "outer" layer is defined as a layer formed a greater distance from the MP trailing side than an "inner" layer. A key feature is that the middle FGL has a magnetization aligned in the direction of the gap field that oscillates when a critical current ($I_c$) is applied, but the FGL magnetization flips to an opposite direction when a current ($I_b$) of sufficient magnitude is reached. Accordingly, there is more reluctance in the WG, which drives more magnetic flux from the MP tip to the ABS and into a magnetic medium for improved writability. Since the STO is recessed at least 10 nm and up to 400 nm from the ABS, fringing growth is considerably reduced compared with a scheme where the STO is at the ABS. Accordingly, MP fringing is controlled and TPI increases substantially compared with conventional MAMR designs.

In one embodiment, the STO is formed on the MP tapered trailing side and has a cross-track width that is at least 10 nm, but not more than a maximum width of the MP tapered trailing side. The STO has a height of 10 nm to 500 nm that represents a distance orthogonal to the ABS, and between a front side at the recessed position and a backside thereof. The down-track thickness is at least 1 nm and may be as large as the WG thickness. Preferably, a non-spin preserving layer, the FGL, and a spin preserving layer are sequentially formed on the MP tapered trailing side and within a write gap, and the FGL has a magnetization saturation (Ms) value from 4 kiloGauss (kG) to 24 kG. The non-spin preserving layer may be Ta, Ru, W, Pt, or Ti while the FGL is preferably a single layer or multilayer comprised of $Ni_xFe_{100-x}$, $Co_yFe_{100-y}$, $Co_zNi_{100-z}$, CoFeNi, or alloys thereof, and where x, y, and z are between 0 and 100 atomic %. The spin preserving layer is one of Cu, Ag, Au, Cr, and Al, or alloys thereof.

In one embodiment, the STO has a rectangular shape from a top-down perspective. However, the STO may have a trapezoidal shape in other embodiments where a narrow side of the trapezoid is a front side facing the ABS, a wide side is the backside, and two sides connecting the front and back sides are substantially parallel to the underlying MP sides. In alternative embodiments, the wide side of the trapezoidal shaped STO is the front side and the narrow side is the backside.

DETAILED DESCRIPTION

The present disclosure is a MAMR writer structure wherein a spin flipping element is recessed from the ABS and formed in the write gap to increase reluctance between the MP and trailing shield when a current of sufficient magnitude is applied thereby forcing more magnetic flux from the MP tip at the ABS to enhance writability. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. The terms spin flipping element and STO may be used interchangeably. The term "behind" refers to an x-axis position of one structural feature with respect to another. For example, component B formed behind component or plane A means that B is at a greater height from the ABS than A. A "front side" of a layer is a side facing the ABS, and a backside or backend faces away from the ABS. A method of forming the spin flipping element of the present disclosure is provided in related U.S. patent application Ser. No. 16/190,790.

Figure 1:
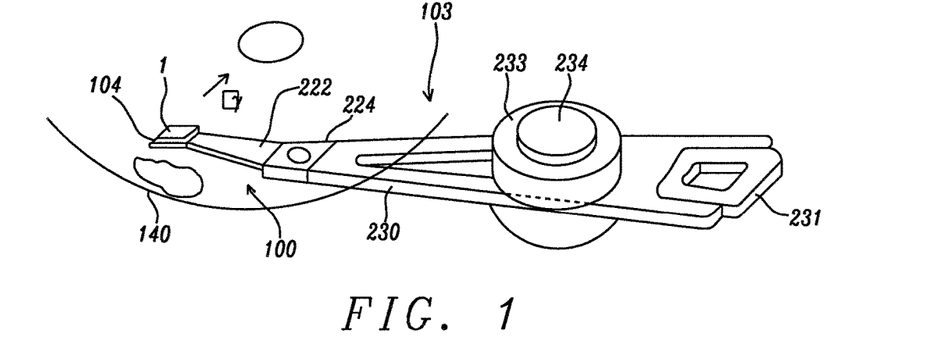
FIG. 1 is a perspective view of a head arm assembly of the present disclosure.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
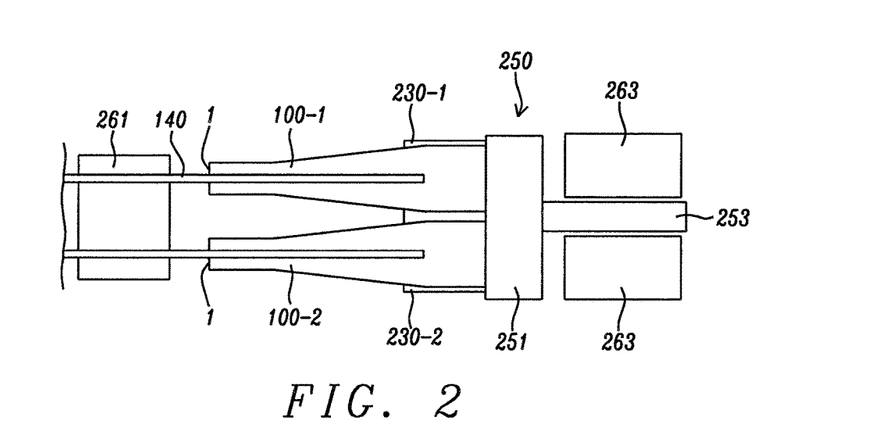
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted on arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
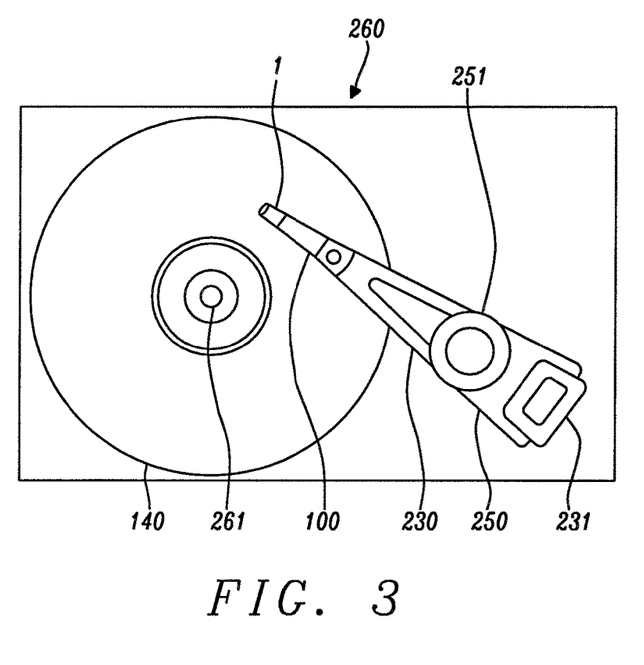
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
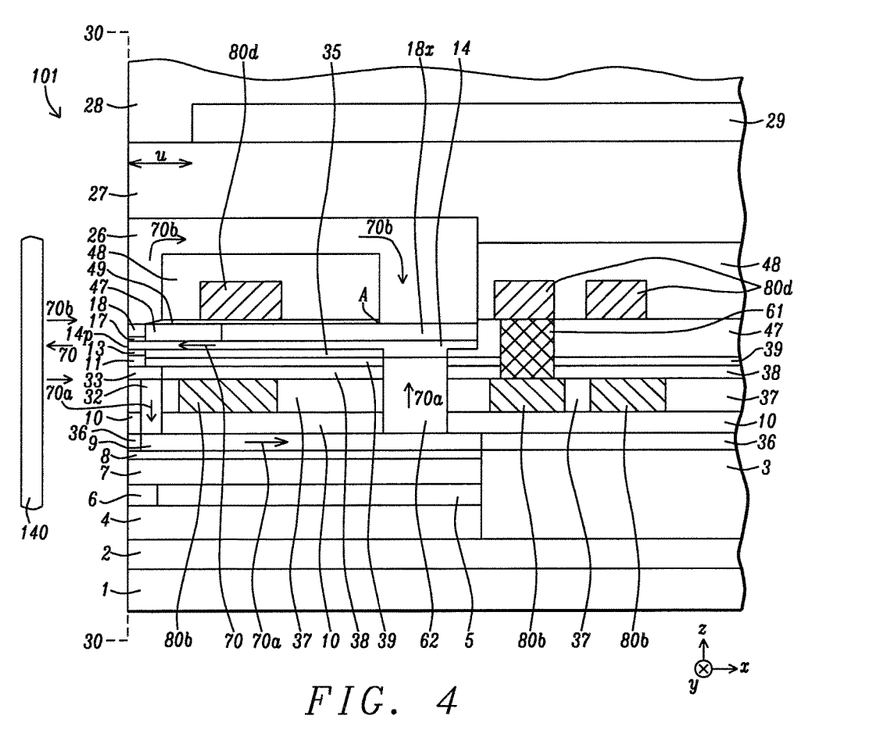
FIG. 4 is a down-track cross-sectional view of a combined read-write head with leading and trailing loop pathways for magnetic flux return to the main pole according to an embodiment of the present disclosure.

Referring to FIG. 4, magnetic recording head 101 comprises a combined read-write head. The down-track cross-sectional view is taken along a plane (44-44 in FIG. 5) formed orthogonal to the ABS 30-30, and that bisects the main pole layer 14. The read head is formed on a substrate 1 that may be comprised of AlTiC (alumina+TiC) with an overlying insulation layer 2 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 4 is formed on insulation layer 2.

A magnetoresistive (MR) element also known as MR sensor 6 is formed on bottom shield 4 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 5 adjoins the backside of the MR sensor, and insulation layer 3 contacts the backsides of the bottom shield and top shield 7. The top shield is formed on the MR sensor. An insulation layer 8 and a top shield (S2B) layer 9 are sequentially formed on the top magnetic shield. Note that the S2B layer 9 may serve as a flux return path (RTP) in the write head portion of the combined read/write head. Thus, the portion of the combined read/write head structure formed below layer 9 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the main pole layer, respectively, and are connected by interconnect 51. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, PP3 shield 26, and top yoke 18x. There is also a leading return loop for magnetic flux 70a that includes leading shield 11, leading shield connector (LSC) 33, S2C 32, return path 9, and back gap connection (BGC) 62. The magnetic core may also comprise a bottom yoke 35 below the main pole layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
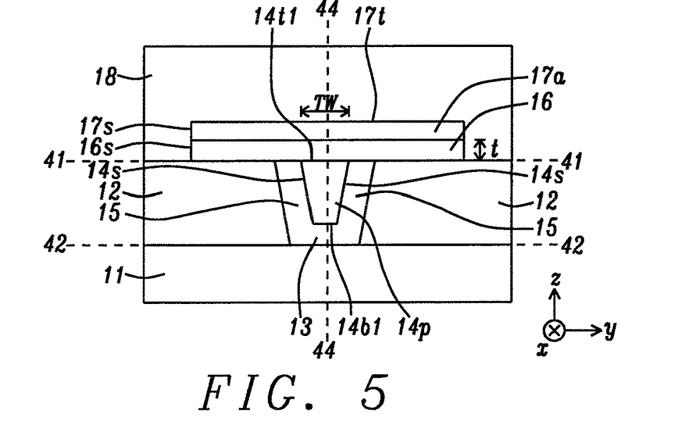
FIG. 5 is an ABS view of an all wrap around (AWA) shield structure surrounding a main pole (MP) according to a conventional perpendicular magnetic recording (PMR) writer design.

Referring to FIG. 5, a main pole (MP) with MP tip 14p having track width TW, trailing side 14t1, leading side 14b1, and two sides 14s formed equidistant from a center plane 44-44 is shown with an AWA shield structure that was described in related application Ser. No. 16/037,197. There is a write gap 16 with thickness t on the MP trailing side, side gaps 15 adjoining each MP side 14s, and a leading gap 13 below the MP leading side. The trailing shield structure comprises a first trailing shield (TS) with a high magnetic saturation value from 19 kiloGauss (kG) to 24 kG, and with a front portion 17a formed on the write gap. The trailing shield structure also includes a second TS layer 18 formed on the first TS top surface 17t and sides 17s, on write gap sides 16s, and on a top surface of the side shields 12 at plane 41-41. Plane 41-41 includes the MP trailing side at the ABS. Side shields contact a top surface of the leading shield 11 at plane 42-42 that is parallel to plane 41-41 and includes the MP leading side at the ABS.

Figure 6:
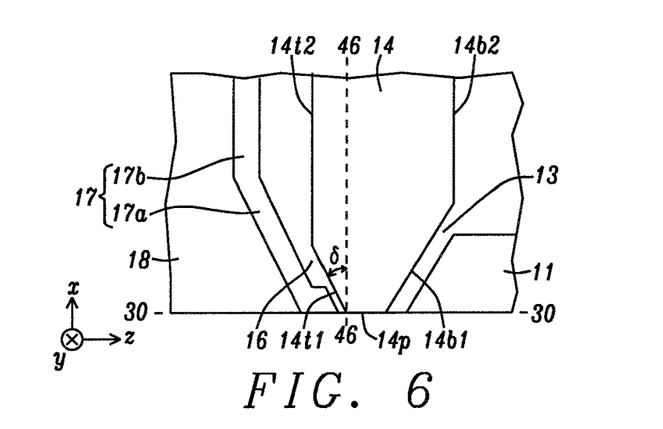
FIG. 6 is a down-track cross-sectional view showing a leading shield and a trailing shield structure on opposite sides of the MP in the PMR writer in FIG. 5.

In FIG. 6, the down track cross-sectional view at center plane 44-44 in FIG. 4 is illustrated and represents a typical layout of a portion of the PMR writer proximate to the MP tip 14p at the ABS 30-30. MP leading side 14b1 is tapered and extends from the ABS 30-30 to MP bottom surface 14b2 that is aligned orthogonal to the ABS. Moreover, a top surface 11t of the leading shield 11 is substantially parallel to the tapered MP leading side and separated therefrom by leading gap 13. The MP trailing side 14t1 is also tapered with taper angle δ with respect to plane 46-46 formed orthogonal to the ABS, and connects with MP top surface 14t2 that is parallel to the MP bottom surface. Write gap 16 is formed between MP tapered trailing side 14t1 and the first TS front portion 17a that is substantially parallel to the MP tapered trailing side. The first TS also has a back portion 17b that is parallel to MP top surface 14t2.

Figure 7:
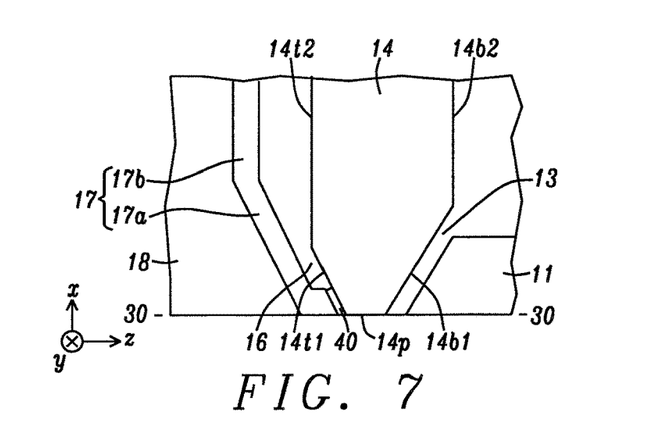
FIG. 7 is a down-track cross-sectional view where the writer structure in FIG. 6 is modified by inserting a STO between the trailing shield and MP at the ABS according to a conventional MAMR design.

Referring to FIG. 7, a conventional MAMR writer structure is depicted that was previously described in related U.S. Pat. No. 8,582,240. In particular, the writer structure in FIG. 6 is modified with the insertion of a STO element 40 at the ABS 30-30 and between the MP tapered trailing side 14t1 and first TS front portion 17a. A magnetic layer (not shown) within the STO oscillates when a critical current ($I_c$) is applied as explained in a later section. Accordingly, a RF field is generated (MAMR effect) and applied to the magnetic medium (not shown) in addition to a write (MP) field emanating from MP tip 14p with the end result of requiring a smaller MP field during a write process. The STO element typically has an insulation layer between two magnetic layers (described in U.S. Pat. No. 8,582,240) that are commonly referred to as a spin polarizing layer and an oscillation layer.

Figure 8:
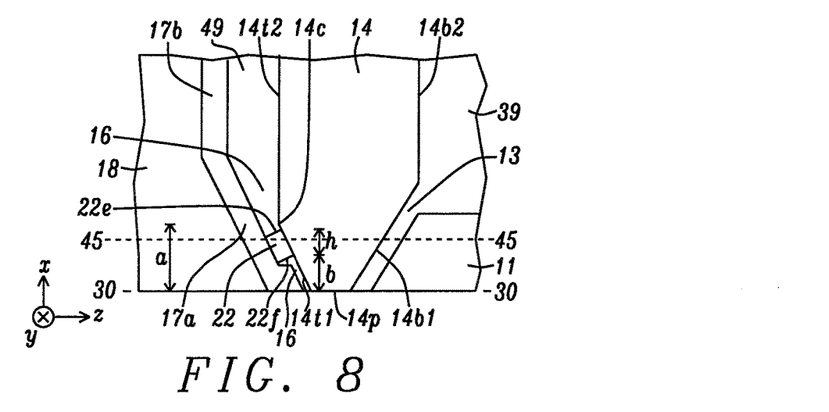
FIG. 8 is a down-track cross-sectional view according to a first embodiment of the present disclosure where a recessed STO is formed within the write gap, and on a MP tapered trailing side.
Figure 9:
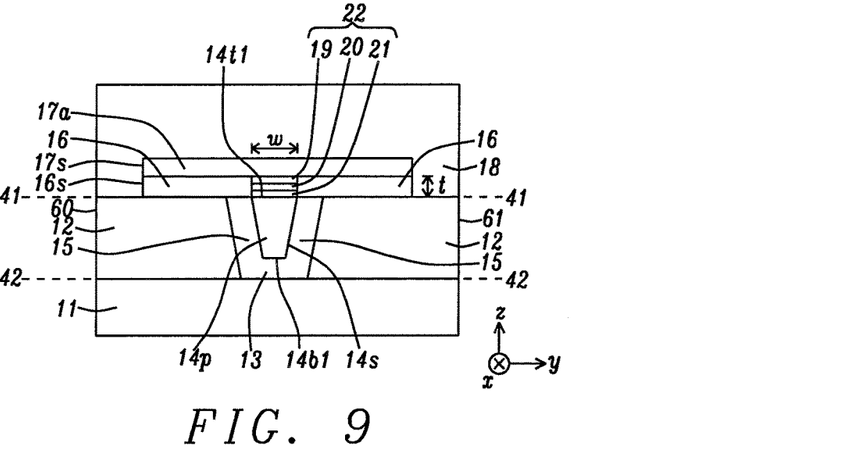
FIG. 9 is cross-sectional view from a plane formed parallel to the ABS that depicts a recessed STO in the write gap between the trailing shield and main pole trailing side according to an embodiment of the present disclosure.

Referring to FIG. 8, a down-track cross-sectional view of a MAMR writer structure according to an embodiment of the present disclosure is illustrated. A key feature is a STO 22 with a front side 22f that is recessed a distance b of 10 nm to 400 nm from the ABS 30-30, and having a backside 22e. In the exemplary embodiment, the STO backside is less than the throat height a, which is proximate to MP corner 14c where the MP tapered trailing side 14t1 connects with MP top surface 14t2. However, in other embodiments, the STO backside may be at a height greater than a. Since fringing is mainly determined by the magnetic field at the ABS, the recessed STO described herein results in significantly less fringing growth compared with the MAMR scheme in FIG. 7. The recessed STO has a height h between the front side and backside of 10 nm to 500 nm, and a down-track thickness in the z-axis direction that is preferably less than or equal to a thickness t of the write gap 16 shown in FIG. 9. Note that the cross-sectional view in FIG. 9 is taken at plane 45-45 that is parallel to the ABS and intersects a middle portion of the STO in FIG. 8. It should be understood that other leading shield and trailing shield designs are compatible with the recessed STO of the present disclosure. Thus, the embodiments of the present disclosure are not limited to the surrounding shield designs including the leading shield, trailing shield, and side shields described herein.

Referring to FIG. 9, a cross-sectional view of STO 22 at plane 45-45 in FIG. 8 is illustrated with a thickness t equivalent to that of write gap 16, and a width w that is essentially equivalent to the width of the MP tapered trailing side 14t1. The STO features a lower non-spin preserving layer 21 on the MP tapered trailing side, a middle flux guiding layer (FGL) 20, and an upper spin preserving layer 19. In other embodiments, STO thickness t may be less than the write gap thickness and w may be less than the maximum width of the MP tapered trailing side. However, STO width is at least 10 nm. Non-spin preserving layer 21 is typically a metal such as Ta, W, Pt, Ru, Ti, or Pd. FGL 20 is a magnetic layer that is preferably a single layer or multilayer structure comprised of one or more of NiFe, FeCo, CoNi, CoFeNi, or an alloy thereof with one or more additional elements. The FGL has a Ms value from 4 kG to 24 kG. The one or more additional elements are selected from B, and metals that are Mo, W, Pt, Pd, or Cr, for example. Spin preserving layer 19 is a conductive layer and is preferably comprised of Cu, Ag, Au, Al, or Cr, or an alloy thereof.

Figure 12:
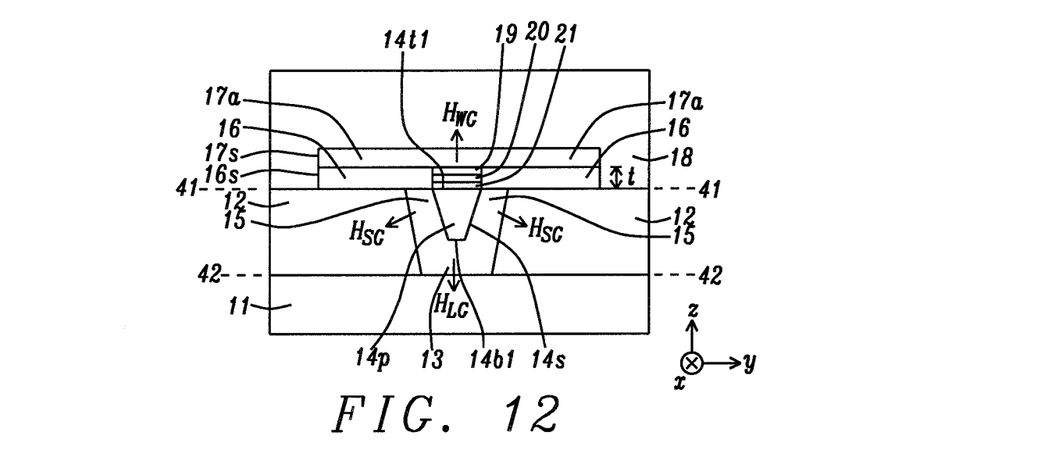
FIG. 12 is an ABS view according to an embodiment of the present disclosure and depicts multi-directional gap fields ($H_{WG}$, $H_{SG}$, $H_{LG}$), and a current Ib oriented in an opposite direction to $H_{WG}$ on the main pole trailing side.

Referring to FIG. 12, a cross-sectional view of STO 22 is shown at plane 45-45 during a write process and depicts gap fields $H_{WG}$, $H_{SG}$, and $H_{LG}$ that emanate from the MP tip 14p and propagate across write gap 16, side gaps 15, and leading gap 13, respectively.

Figure 13:
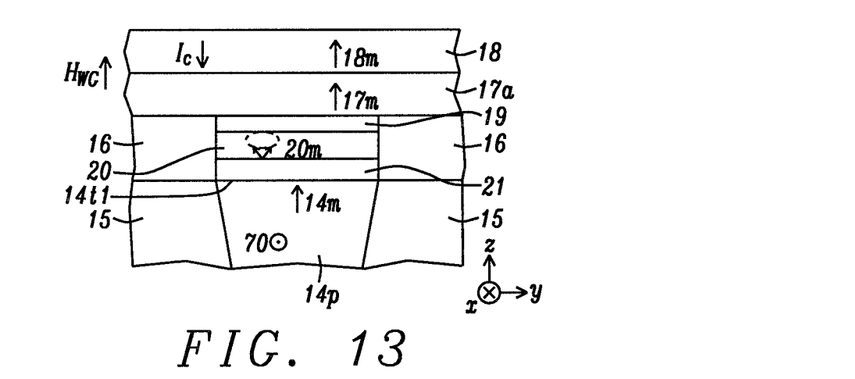
FIG. 13 is an ABS view where a critical current ($I_c$) has a magnitude that causes magnetization in the STO magnetic layer to oscillate.
Figure 14:
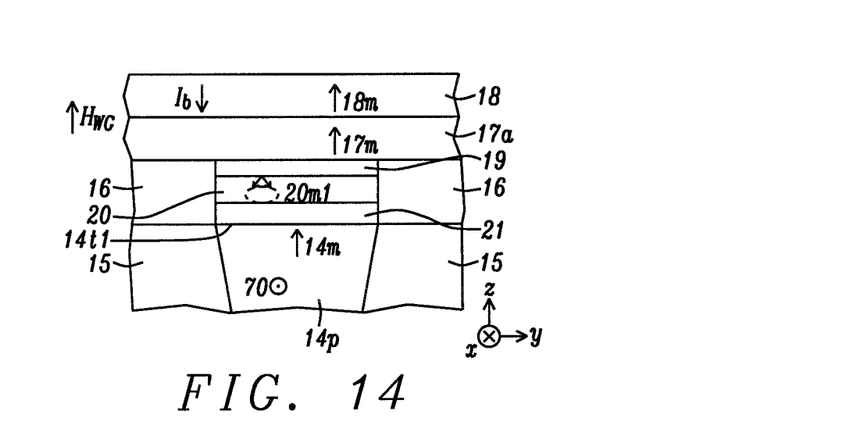
FIG. 14 is an ABS view of the STO in FIG. 13 after a second current ($I_b$) is applied with a magnitude sufficient to flip the STO magnetization to a position opposite to the gap field according to an embodiment of the present disclosure.

A key feature of the FGL 20 of the present disclosure is explained with regard to FIGS. 13-14 where the region in the writer structure surrounding the STO 22 in FIG. 9 is enlarged. In FIG. 13, FGL 20 has a magnetization 20m that is aligned substantially parallel to the write gap field $H_{WG}$ and to MP magnetization 14m at MP tapered trailing side 14t1, and substantially parallel to first and second TS magnetizations 17m, 18m, respectively, when a critical current $I_c$ is applied in a direction opposite to $H_{WG}$. The critical current drives FGL magnetization 20m into an oscillation state because there are enough electrons in $I_c$ with magnetic moment parallel to magnetization 17m being extracted out of magnetization 20m while electrons with a moment anti-parallel to 17m are reflected back from first TS front portion 17a. When the critical current is maintained, the FGL has a stable oscillation that is useful in generating a radiofrequency field (not shown) that assists the write process on a magnetic medium. Note that during a write process, magnetic flux (MP field) 70 from MP tip 14p comes out of the plane of the drawing (at the ABS) and into a magnetic medium (not shown).

However, as shown in FIG. 14, when the applied current $I_b$ becomes sufficiently large, where $I_b > I_c$, FGL magnetization 20m flips to become magnetization 20m1 in a direction substantially opposite to $H_{WG}$. In preferred embodiments, $I_b$ has a current density in a range of $1 \times 10^{-7}$ to $1 \times 10^{-9}$ Amp/cm$^2$. The mechanism is based on the behavior of electrons with spins parallel and anti-parallel to the moment in the trailing shields. The portion of electrons having a moment that is parallel to TS magnetization 17m, 18m are able to enter first TS front portion 17a with very little resistance. However, electrons with a moment that is anti-parallel to TS magnetization do not enter the first TS shield easily because of less unoccupied states in the first TS, and are back scattered back to the FGL. As a result, a spin torque is exerted on FGL magnetization. Accordingly, FGL magnetization is flipped and becomes magnetization 20m1, which is primarily oriented toward the MP tapered trailing side 14t1. Thus, there is a greater reluctance in the write gap, which means that $H_{WG}$ across write gap 16 is reduced and forces additional magnetic flux to surrounding area, a portion of which will enhance magnetic flux 70 out of MP tip 14p at the ABS and into the magnetic recording medium. In some embodiments, the cone angle that indicates oscillation for magnetization 20m1 may be proximate to 0 degrees if $I_b$ becomes sufficiently large enough.

Figure 15A:
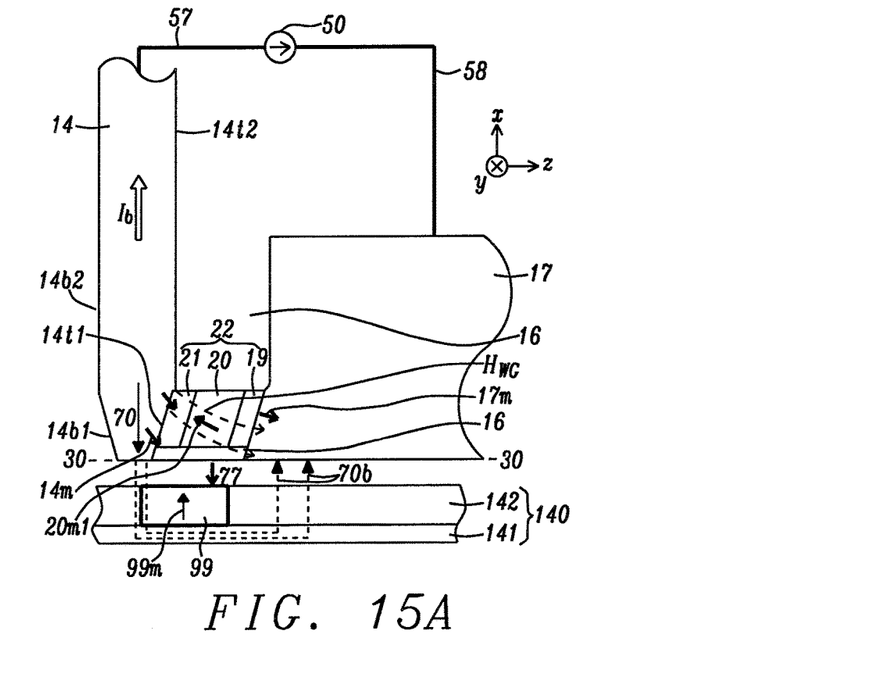
FIG. 15A is a down-track cross-sectional view of a MAMR writer wherein FGL magnetization is flipped to a direction substantially opposite to the WG field $H_{WG}$ according to an embodiment of the present disclosure.

A conventional MAMR writer structure and a description of a STO device having a MAMR assist effect during a write process by way of generating a RF field on a magnetic bit was previously described in related U.S. Pat. No. 8,582,240. In FIG. 15A, a down-track cross-sectional view of a recessed STO device 22 wherein FGL 20 has magnetization 20m (FIG. 13) that flips to an opposite direction to magnetization 20m1 when a current ($I_b$) of sufficient magnitude is applied across the STO from first TS layer (front portion) 17a to MP tapered trailing side 14t1. FGL magnetization 20m1 has a direction substantially anti-parallel to $H_{WG}$. Although the exemplary embodiment shows a STO design with a FGL between a spin preserving layer 19 and a non-spin preserving layer 21, the STO device is not limited to a three layer stack and may comprise other STO schemes known in the art. The MAMR effect results when flipped magnetization 20m1 has a precessional state with a cone angle α (FIG. 15B) that is sufficiently large to generate a RF field 77 that causes magnetic bit 99 to oscillate (not shown) and require a lower switching current (lower MP field 70) to switch magnetic bit 99. In some embodiments, the flipped FGL magnetization results not only in a MAMR assist effect, but also effectively lowers $H_{WG}$ thereby enhancing the MP field 70. Magnetic medium 140 has a magnetic recording layer 142 with a plurality of bits formed on a soft underlayer 141.

Figure 15B:
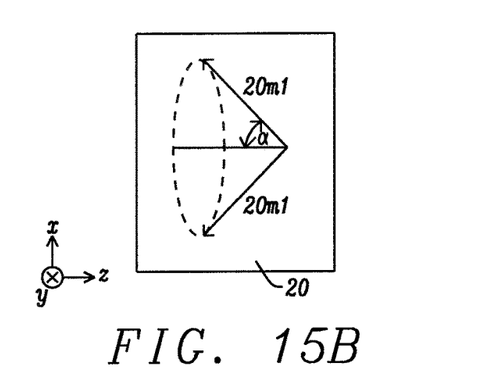
FIG. 15B shows a precessional angle of the FGL magnetization in FIG. 15A.

As shown in FIG. 15B, when current $I_b$ is applied from first TS layer 17 to MP 14, FGL magnetization 20m flips to a direction that is substantially anti-parallel to $H_{WG}$ that enhances MP write field 70 on magnetization 99m in a magnetic bit 99. Current $I_b$ is applied from a direct current (DC) source 50 through lead 58 to first TS layer 17 and exits the MP 14 through a second lead 57. The STO device 22 is configured so that sufficient spin torque (not shown) from TS 17 is exerted on FGL 20 to flip the FGL magnetization. As cone angle α approaches 0 degrees, there is a maximum boost to the MP field 70 and a negligible RF field 77.

Figure 10A:
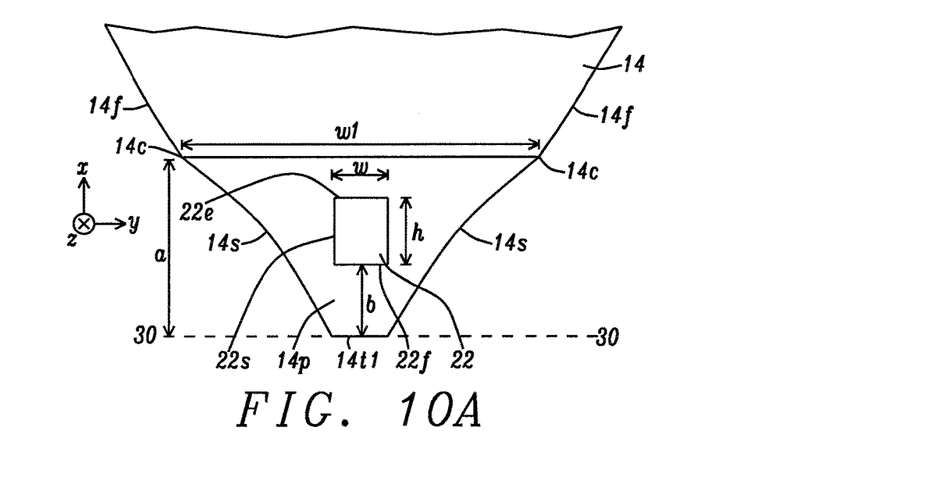
FIGS. 10A-10B and FIGS. 11A-11B are top-down views according to embodiments of the present disclosure where a STO is formed on a MP trailing side and has a rectangular shape, and a trapezoidal shape, respectively.

Referring to FIG. 10A, a top-down view of STO 22 is shown with overlying layers removed. According to a first embodiment, the STO has a substantially rectangular shape with sides 22s that are aligned orthogonal to ABS 30-30, and connect front side 22f to backside 22e. MP sides 14s on the MP tip portion 14p with exposed MP tapered trailing side 14t1 adjoin a MP back portion 14 with flared sides 14f at height a. As mentioned previously, the STO is recessed to height b from the ABS, and has height h between the front side and backside. In some embodiments, w<h. Note that the two MP sides are separated with increasing cross-track width up to a maximum MP tapered trailing side width w1 as the distance increases from the ABS.

Figure 10B:
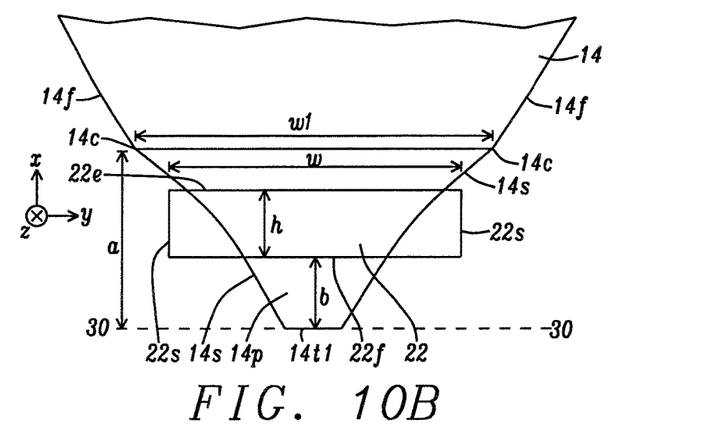

Another STO embodiment is depicted in FIG. 10B where the rectangular shape in FIG. 10A is widened in the cross-track direction such that w≥h. Moreover, when w is sufficiently larger than h, a portion of the STO may overlay on each MP side 14s. The MP tapered trailing side 14t1 has a maximum width w1 between corners 14c at height a. Preferably, STO 22 has a cross-track width w where w≤w1.

Figure 11A:
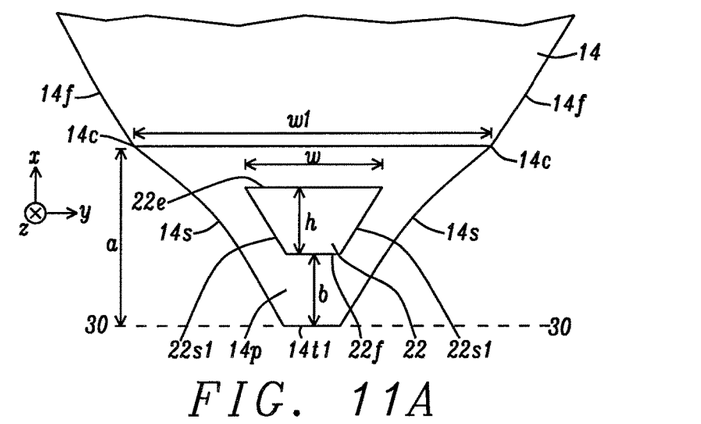

Referring to FIG. 11A, the present disclosure also encompasses an embodiment where STO 22 has a trapezoidal shape wherein two sides 22s1 are substantially parallel to MP sides 14s, and connect STO front side 22f with backside 22e. In the exemplary embodiment, cross-track width w may be sufficiently small such that none of the STO overlays on MP sides 14s. Although, backside 22e is shown having a larger width than the STO front side 22b, the front side may have a larger width than the backside in other embodiments (not shown). However, in the alternative embodiments, the trapezoidal sides are not parallel to MP sides 14s.

Figure 11B:
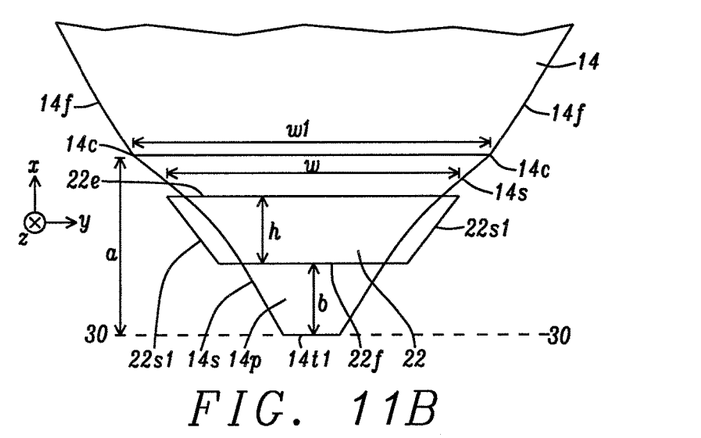

In FIG. 11B, the trapezoidal shape in the previous embodiment is modified so that the widths of STO front side 22f and backside 22e are substantially larger while the backside still has a greater width than the front side, and sides 22s1 are substantially parallel to MP sides 14s. As a result, a portion of STO 22 may overlay on each MP side 14s when w is proximate to w1. In other embodiments (not shown), the STO front side 22f may have a greater width than the STO backside. In all embodiments, width w is preferably less than the maximum width w1 of the MP tapered trailing side between MP corners 14c at height a.

The spin flipping element (STO) described herein provides the benefit of reducing the gap field $H_{WG}$ between MP tip 14p and the trailing shield structure comprised of first and second TS layers 17, 18, respectively, and enhancing the write field 70 that is orthogonal to the ABS and directed to one or more bits on a magnetic medium 140 (FIG. 4). As shown in FIG. 14 where a FGL in a recessed STO is formed in the write gap, a current $I_b$ of sufficient magnitude may be applied opposite to the $H_{WG}$ such that FGL magnetization flips from a direction parallel to $H_{WG}$ to a direction that is anti-parallel to $H_{WG}$. As a result, reluctance is increased between MP tapered trailing side 14t1 and first TS shield 17a thereby enhancing magnetic flux 70 from the MP tip 14p at the ABS.

In order for STO 22 to have acceptable reliability, the magnitude of current $I_b$ must be maintained as low as possible since excessive current may cause degradation of one or more STO layers 19-21 due to electromigration and/or excessive local heating. It should be understood that the electrical current direction required for the FGL 20 to perform as designed is from the trailing shields→spin preserving layer→FGL→non-spin preserving layer→MP. In other words, the current $I_b$ direction is independent of the gap field direction. In fact, the current direction stays the same when the gap field is switched to the opposite direction in order to write a transition.

We have demonstrated the benefits of the STO of the present disclosure by performing a finite element modeling (FEM) simulation where the write bubbles of the MAMR writer of the embodiment in FIG. 8, the PMR writer in FIG. 6, and the conventional MAMR writer in FIG. 7 are compared. The MAMR writer formed according to an embodiment of the present disclosure and the conventional MAMR writer each have a STO with a rectangular shape having a height (h)=50 nm, cross-track width (w)=40 nm, and down-track thickness (t)=5 nm. The taper angle (δ) of the MP tapered trailing side in each writer is 25 degrees with respect to a plane that is orthogonal to the ABS as shown previously in FIG. 6. The MAMR writer formed according to an embodiment of the present disclosure has a front side that is recessed to a height of 120 nm from the ABS.

Figure 16:
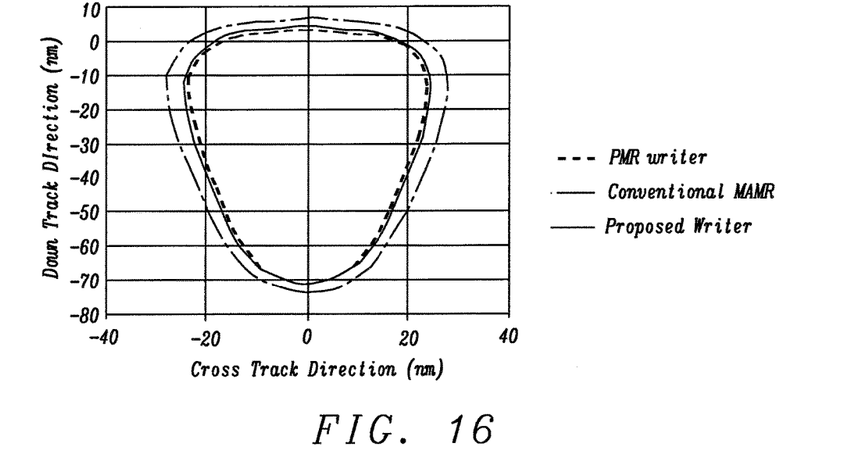
FIG. 16 is a plot of cross-track position vs. down-track position and shows FEM simulation results for a write bubble at 5000 Oe for a writer with recessed STO according to an embodiment of the present disclosure in comparison with conventional PMR and MAMR writers.

The simulated write bubble results are illustrated in FIG. 16. Although the conventional (current) MAMR writer example has significant fringing growth (and TPI loss) compared with the PMR writer, fringing growth is controlled in the MAMR writer of the FIG. 8 embodiment such that the write bubble at 5000 Oe is essentially the same size as that of the PMR writer.

Figure 17:
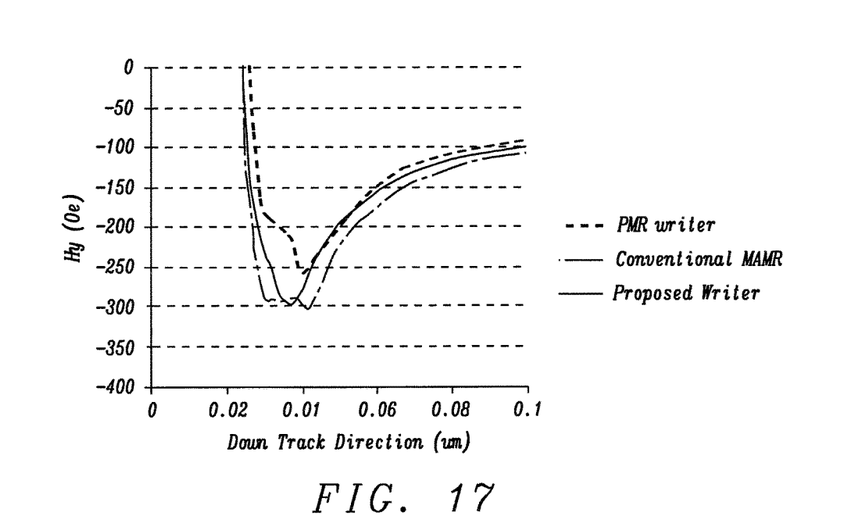
FIG. 17 is a plot of Hy field vs. down-track position that compares trailing shield return field for a writer with a recessed STO according to an embodiment of the present disclosure with conventional PMR and MAMR writers.

Referring to FIG. 17, a second part of the FEM simulation was to compare the down-track field profile for each of the aforementioned three writers. Hy, the field component normal to the ABS as observed at a media position 15 nm away from the MP tip was plotted as a function of down-track position. We find the conventional MAMR writer shows a better return field (more negative value) than the PMR writer, indicating better bits per inch (BPI) capability. The MAMR writer according to an embodiment of the present disclosure has substantially the same return field as the conventional MAMR writer. Therefore, the overall performance of the disclosed writer according to the embodiment shown in FIGS. 8-9 will have better TPI while maintaining BPI compared with the conventional MAMR writer, which means higher area density capability (ADC) is achieved.

While the present disclosure has been particularly shown and described with reference to, the preferred embodiment thereof, it will be understood by those skilled in the art that various changes in form and details may be made without departing from the spirit and scope of this disclosure.

We claim:

1. A microwave assisted magnetic recording (MAMR) writer, comprising:
   (a) a main pole comprised of a leading side and a tapered trailing side, and two sides connecting the leading and tapered trailing sides that each extend from an air bearing surface (ABS) to a MP corner at a first height (a) where the MP tapered trailing side connects to a MP top surface that is aligned orthogonal to the ABS, and wherein the MP corners are separated by a first width (w1);
   (b) a write gap formed on the MP tapered trailing side;
   (c) a first trailing shield (TS) on the write gap, wherein a front portion of the first TS is substantially parallel to the MP tapered trailing side; and
   (d) a spin flipping element formed on the MP tapered trailing side and within the write gap, and recessed a second height (b) from the ABS, comprising:
   (1) a lower non-spin preserving layer on the MP tapered trailing side;
   (2) a middle flux guiding layer (FGL) having a magnetization aligned substantially parallel to a write gap field ($H_{WG}$) from the main pole during a write process, and wherein the MAMR writer is configured so that the FGL magnetization flips to a direction substantially opposite to $H_{WG}$ when a current $I_b$ of sufficient magnitude is applied in a direction from the first TS towards the main pole; and (3) an upper spin preserving layer.

2. The MAMR writer of claim 1 wherein the spin flipping element has a thickness equal to or less than a write gap thickness, and a cross-track width (w) that is less than or equal to w1.

3. The MAMR writer of claim 2 wherein the spin flipping element has a trapezoidal or a substantially rectangular shape from a top-down view.

4. The MAMR writer of claim 3 wherein w is sufficiently large so that a portion of the trapezoidal or substantially rectangular shape overlays on the two MP sides.

5. The MAMR writer of claim 3 wherein the trapezoidal shape of the spin flipping element comprises a front side with a smaller cross-track width than a backside thereof, and wherein two sides that connect the front and back sides are formed substantially parallel to the two MP sides.

6. The MAMR writer of 3 wherein the trapezoidal shape of the spin flipping element comprises a front side with a larger cross-track width than a backside thereof.

7. The MAMR writer of claim 2 where the cross-track width w is at least 10 nm.

8. The MAMR writer of claim 1 wherein the second height (b) is from 10 nm to 400 nm.

9. The MAMR writer of claim 1 wherein a third height (h) between a front side and a backside of the spin flipping element is from 10 nm to 500 nm.

10. The MAMR writer of claim 9 wherein the spin flipping element backside is less than the first height from the ABS.

11. The MAMR writer of claim 1 wherein the non-spin preserving layer is one of Ta, W, Pt, Ru, Rh, and Pd.

12. The MAMR writer of claim 1 wherein the FGL is comprised of a single layer or multilayer of magnetic material that is one or more of NiFe, CoFe, CoNi, CoFeNi, and alloys thereof with one or more additional elements that are B, Mo, Pt, Pd, W, and Cr.

13. The MAMR writer of claim 1 wherein the spin preserving layer is a conductive layer that is one of Cu, Ag, Au, Al, or Cr, or an alloy thereof.

14. The MAMR writer of claim 1 wherein $I_b$ has a current density that is in a range of $1 \times 10^{-7}$ Amp/cm$^2$ to $1 \times 10^{-9}$ Amp/cm$^2$.

15. The MAMR writer of claim 1 wherein the two MP sides are separated with increasing cross-track width up to w1 with increasing distance from the ABS.

16. The MAMR writer of claim 1 wherein the FGL has a magnetization saturation (Ms) value from 4 kiloGauss (kG) to 24 kG.

17. The MAMR writer of claim 1 wherein the main pole is surrounded with an all wrap around shield structure at the ABS comprised of a second trailing shield on the first trailing shield and on a side shield on each side of a center plane that bisects the MP leading and trailing sides, the side shields wherein each side shield is separated from one of the two MP sides by a side gap, and a leading shield that is separated from the MP leading side by a leading gap.

18. The MAMR writer of claim 1 that is part of a combined read-write head.

19. A head gimbal assembly (HGA), comprising:

(a) a slider on which the MAMR writer of claim 1 is formed; and (b) a suspension that has a flexure to which the slider is joined, a load beam with one end connected to the flexure, and a base plate connected to the other end of the load beam.

20. A magnetic recording apparatus, comprising:

(a) the HGA of claim 19;

(b) a magnetic recording medium positioned opposite to the slider;

(c) a spindle motor that rotates and drives the magnetic recording medium; and (d) a device that supports the slider, and that positions the slider relative to the magnetic recording medium.

* * * * *